United States Patent [19]
Eide

[11] Patent Number: 6,120,369
[45] Date of Patent: Sep. 19, 2000

[54] METHOD AND A MACHINE FOR CUTTING FISH-CUTLETS

[75] Inventor: Ragnar Eide, Stavanger, Norway

[73] Assignee: Trio Industrier AS, Forus, Norway

[21] Appl. No.: 08/716,148

[22] PCT Filed: Mar. 9, 1995

[86] PCT No.: PCT/NO95/00053

§ 371 Date: Sep. 11, 1996

§ 102(e) Date: Sep. 11, 1996

[87] PCT Pub. No.: WO95/24129

PCT Pub. Date: Sep. 14, 1995

[30] Foreign Application Priority Data

Mar. 11, 1994 [NO] Norway ..................................... 940867

[51] Int. Cl.[7] .................................................. A22C 25/18
[52] U.S. Cl. .......................... 452/149; 452/126; 452/161
[58] Field of Search .................................. 452/149, 151, 452/155, 160, 161, 162, 125, 126

[56] References Cited

U.S. PATENT DOCUMENTS

| 1,920,339 | 8/1933 | Baader | 17/4 |
|---|---|---|---|
| 1,921,440 | 8/1933 | Taylor | 452/126 |
| 4,043,003 | 8/1977 | Lemmon | 452/149 |
| 4,726,044 | 2/1988 | Braeger | 452/157 |
| 5,163,865 | 11/1992 | Smith | 452/157 |
| 5,507,690 | 4/1996 | Eide | 452/161 |

FOREIGN PATENT DOCUMENTS

| 362461 | 3/1989 | European Pat. Off. . | |
| 1429907 | 2/1973 | Germany | 452/161 |
| WO 93/22929 | 5/1993 | WIPO . | |

*Primary Examiner*—Willis Little
*Attorney, Agent, or Firm*—Jenner & Block

[57] ABSTRACT

A machine and method for mechanically cutting fish pieces includes a band knife for making cuts substantially parallel to a circumferential direction of a freezing drum. The first cutting device is adapted to be the first to come in contact with an uncut fillet and makes at least one cut directed in a thickness direction of the fillet laterally of the two main faces of the fillet and substantially parallel to a jacket face of a freezing drum. The first cutting device has at least one knife preferably providing self motion.

11 Claims, 3 Drawing Sheets

METHOD AND A MACHINE FOR CUTTING FISH-CUTLETS

BACKGROUND OF THE INVENTION

This invention relates to a method and a machine especially for cutting fish pieces, e.g. pieces/slices of a size ready to be served without further cutting, from fish fillets, but the method and machine may also be used for cutting pieces of meat. The fish pieces may have the form of elongated pieces as a result of the fact that the fish fillet has been cut longitudinally, or they may result from longitudinally and/or laterally cutting of fish fillets.

A general object of the present invention has been to provide machinable boned and skinned fish pieces which may have a size readily to be served, e.g. a uniform size ready for the pan. Fish pieces having appropriately equal circumferential sizes, possibly with varying thicknesses may prove to be a valuable raw material when making fish courses in restaurants and for parties. One possible fish piece shape is the square shape, but, according to the invention, the conditions intentionally having been adapted for mechanical production of boned and skinned fish pieces having a plurality of circumferential shapes, inclusive such fish piece shapes where one restriction edge is made by letting a knife or another cutting tool more or less follow the adjacent edge of the fillet.

From NO patent application No. 92,1899 it is previously known a method and a machine for cutting slices from non-skinned fish fillets, where the fillets are fed toward a freezing drum causing freezing and securing the fillet firmly at the skin side, in order to allow convenient and efficient working of the fillet in this securely anchored position. Thereby, the fish fillet is orientated such that its longitudinal direction coincides with the circumferential direction of the freezing drum. A cutting tool in the form of a driven endless band knife's active cutting edge is positioned at a radial distance from the drum mantle surface, corresponding to the desired thickness of fish slices (cut parallel to the skin), and where, from the fillet sticking to the freezing drum, a fish meat slice is cut, the divitional plan thereof extending substantially parallel to the drum circumference.

SUMMARY OF THE INVENTION

Such a method which can be used in connection with the present invention in order to realize the general object of the invention in association with a freezing drum and, thus, utilize the advantages thereof in fish fillet treatment, is known in combination with skinning.

NO patent application No. 921899 discloses a displacement of the band knife's cutting edge step by step in relation to the drum circumference between two succeding rotations of the freezing drum carrying fillets, frozen to the drum at the skin side, in order to cut further fish meat slices successively, parallel to the first slice and to the skin side, one fish meat slice per freezing drum rotation.

Likewise, such a method can be used in connection with the present invention whenever there exists a need for relatively thin fish pieces.

It should be noted that prior art working of fish fillets utilizing a freezing drum, exclusively limits itself to cutting operations where the cuts extend parallel to or approximately parallel to the drum circumference and, thus, parallel to the skin side frozen to the drum.

By means of commonly known mechanical skinning methods, only skinned fillets having a non-cut circumferential shape are obtainable. By means of the method according to NO patent application No. 921899, fillet-shaped fish meat slices having somewhat varying sizes and shapes are achieved. These have been found to be well suitable for smoking. In mechanical fish fillet working and processing, the state of the art does not allow—utilizing the advantages of a freezing drum—the achievement of e.g. equal-sized and uniformly shaped fish pieces of a size ready to be served (after cooking), ready to be put on a frying pan, etc. In some fish courses, oblong fish pieces are desired, whilst in other fish courses, square pieces are preferred.

Used in combination with a generally known skinning method, realized in association with a rotary cylindrical freezing drum, the present invention aims at achieving fish pieces having a maximum thickness, corresponding to the original thickness of the fish fillet minus the skin.

Used in combination with a mechanical method in accordance with NO patent application No. 921899, the present invention aims at obtaining fish pieces having substantially less thicknesses, possibly mutually differing thicknesses.

With the methods concerned, based on the use of a rotary, cylindrical freezing drum, a basic step consists in that the fish skins—after the fish meat pieces have been cut off and removed from the drum—are melted loose and/or scraped away.

In the foregoing, the objects of the present invention have been discussed.

Said objects are realized through proceeding according to the following method-claims. For the implementation of this method, the apparatus-claims define a fish processing machine for making fish pieces of the kind concerned, said machine distinguishing itself through a number of constructive features which, in combination, function very satisfactory and ensure neatly cut fish pieces having equal shapes and sizes, whenever this is desirable, or deliberately mutually varying shapes and/or sizes, whenever this is desirable.

Thus, the invention relates to a method for mechanical cutting of fish pieces, e.g. pieces ready to be served (after cooking), from fish fillets which, skin on, are fed toward a rotary, cylindrical freezing drum, on which the fish skin is frozen, resting against the freezing drum circumference, and where the fish skin is melted loose and/or scraped away in a terminal operation after the fish meat has been cut loose and removed from the drum. In connection with such a method, the cutting means which is adapted to cause a cut parallel to the drum circumference and the skin side frozen thereto, may possibly be adapted to be set in relation to the drum circumference between two immediately succeding drum rotations, so that several parallel cuts can be effected, in order to achieve fish slices each having a substantially less thickness than the original fish fillet. If one, in accordnace with the present invention, is to cut fish pieces having a relatively small thickness, the last-mentioned alternative, based on NO patent application No. 921899, will be preferable. However, it should be emphasized that the present invention functions entirely satisfactory in combination with a conventional skinning process based on a rotary freezing drum arrangement.

In combination with one or the other of the methods mentioned above, the method according to the invention distinguishes itself in that—while the fish fillet's skin side is frozen to the rotary, cylindrical freezing drum and, thus, participates in the rotation thereof—at least one cut is executed in the fish fillet, directed substantially radially in relation to the freezing drum, mainly in the lateral and/or longitudinal planes thereof.

When the fish fillet in a terminal cutting operation is alloted a cut substantially parallel to the drum circumference in well known manner, two fish pieces are obtained, these pieces, according to the invention, are cut perpendicular to the two main surfaces of the fillet. This represents the main principle of the present invention, said principle can be built out through detail features, so that, in a more advanced embodiment—from one single fish fillet—a plurality of usually equal-sized fish pieces can be cut, adequate in size and/or shape for the fish dish concerned; alternatively a smaller number of fish pieces can be cut, having mutually varying shape and sizes, and where the contour of a couple of fish pieces possibly is brought to follow the original limiting edges of the fish fillet; in all cases the mechanically made fish pieces, in accordance with the invention, have been subjected to cutting operations where the cuts extend substantially perpendicularly to the fish fillet being processed.

A machine according to the invention for carrying out this method is substantially built as a skinning machine or as a more advanced machine in accordance with NO patent application No. 921899, respectively. The machine according to the invention distinguishes itself by comprising at least a first cutting device adapted to execute cuts in the rotating fish fillet extending substantially radially in relation to the freezing drum and, thus, substantially perpendicular to the fish fillet.

Preferred is an orientation of the fish fillets making the longitudinal direction thereof substantially to coincide with the freezing drum's circumference and rotational direction. Said first cutting device which appropriately may comprise one or more rotary, circle disc-shaped knives, is adapted to cut the fish fillet in longitudinal stripe-shaped pieces, which will stick to the skin (or to the skin plus a fish fillet portion not cut through, respectively—when the cutting device according to the invention is used in combination with a machine as defined in NO patent application No. 921899). Then, said stripe-shaped fish meat pieces are released from skin/remaining fish fillet by means of the band knife, known per se, the latter executing its cut parallel to the freezing drum circumference.

First cutting device may consist of one knife only. However, it preferably comprises several circle disc-shaped rotary knives of the type well known in fish processing techniques. The knives are mounted on a common drive shaft extending parallel to the freezing drum axis, so that the knives extend perpendiculary to the mantle face of the drum. The plane of each knife is parallel to the lateral plane of the drum. In order to enable cutting of differently wide stripe-shaped fish pieces, it is suitable to work with adjustable knives. Thus, it is an advantage that the mutual distance between the knives can be adjusted infinitely variably. In order to obtain fish pieces having a smaller thickness than the fillet being treated, the knives of first cutting device must also be adjustable in relation to their spacing from the drum's jacket surface. Thus, it is possible to cut stripe-shaped fish pieces to a limited depth in the fillet. Said depth may be positioned in a varying distance from the skin, and the band knife will then be set for cutting of an equally thick slice having cuts originating from the knives of first cutting device. Thus, stripe-shaped fish pieces which are thinner than the fillet are achieved, and what remains of the fillet can upon the next freezing drum rotation be cut into new stripe-shaped fish pieces which, thereafter, are cut off by means of the band knife, until the entire fillet thickness has been used for fish piece making. The knives of first cutting device may in addition to the previously mentioned adjustability be displaceable laterally, and their position on the drive shaft is adapted to be changed at speed.

Then, e.g. the outermost knives on the shaft may be brought to follow the contour of the fish fillet.

In addition to first cutting device, the machine according to the invention may advantageously be equipped with a second cutting device which—as the knife/knives of first cutting device—is adapted to make cuts in the fillet, said cuts extending substantially radially in relation to the freezing drum axis, second cutting device's knife/knives is/are orientated perpendicularly to first cutting device's knife/knives, so when first cutting device's knives make longitudinal cuts, second cutting device's knife or knives makes/make lateral cuts extending at least approximately perpendicular to the longitudinal cuts. When said band knife makes its cut parallel to the freezing drum circumference, the square fish pieces are released from the remaining fish fillet, which can be further cut into square fish pieces. Second cutting device's knife or knives may be adjustably disposed in relation to the jacket surface of the drum, so that the cut depth becomes adjustable. This lateral cutting should, preferably, take place without bringing the freezing drum to stop. Second cutting device's lateral knife or knives must, therefore, be adapted to move synchronously with the rotary freezing drum, in order to effect one or more straight cuts laterally of the fillet. Thus, the lateral knife is suitably guidable along two paths, namely along an axis parallel to the drum axis and along a portion of a circular arc-shaped path outside the drum and having its centre at the drum axis. Second cutting device/the lateral knife (knives) is disposed on a carriage which is dispaceable on guide rails extending along a circular arc, parallel to the freezing drum circumference. The lateral knife may be rotatable around an axis parallel to the freezing drum axis, e.g. by means of a servo-cylinder.

Especially when one desires fish pieces which are a result of the fact that one fillet is cut longitudinally and laterally as well as cut through two or more times parallel to the main surfaces thereof (such as the skin side), the respective cutting operations performed by the cutting devices/knives should be controlled by means of a computer after the circumference and width of the fillet have been read. With a basis in NO patent application No. 921899 and generally known and conventional technique, computer-based reading and control technique, an average person skilled in the art could probably, without any inventive achievement, readily produce an adequate technique. The computer-based control of the various cutting operations in relation to each other, respectively in relation to the position of the fillet (whole or cut) on the freezing drum as well as the fillet's moment of feeding in relation to the freezing drum, do not constitute any subjects for the present invention.

BRIEF DESCRIPTION OF THE DRAWINGS

In the following, the invention is further explained with reference to the accompanying drawings showing embodiments, and wherein.

DETAILED DESCRIPTION OF THE PREFERRED EMBODIMENTS

Figure 1:
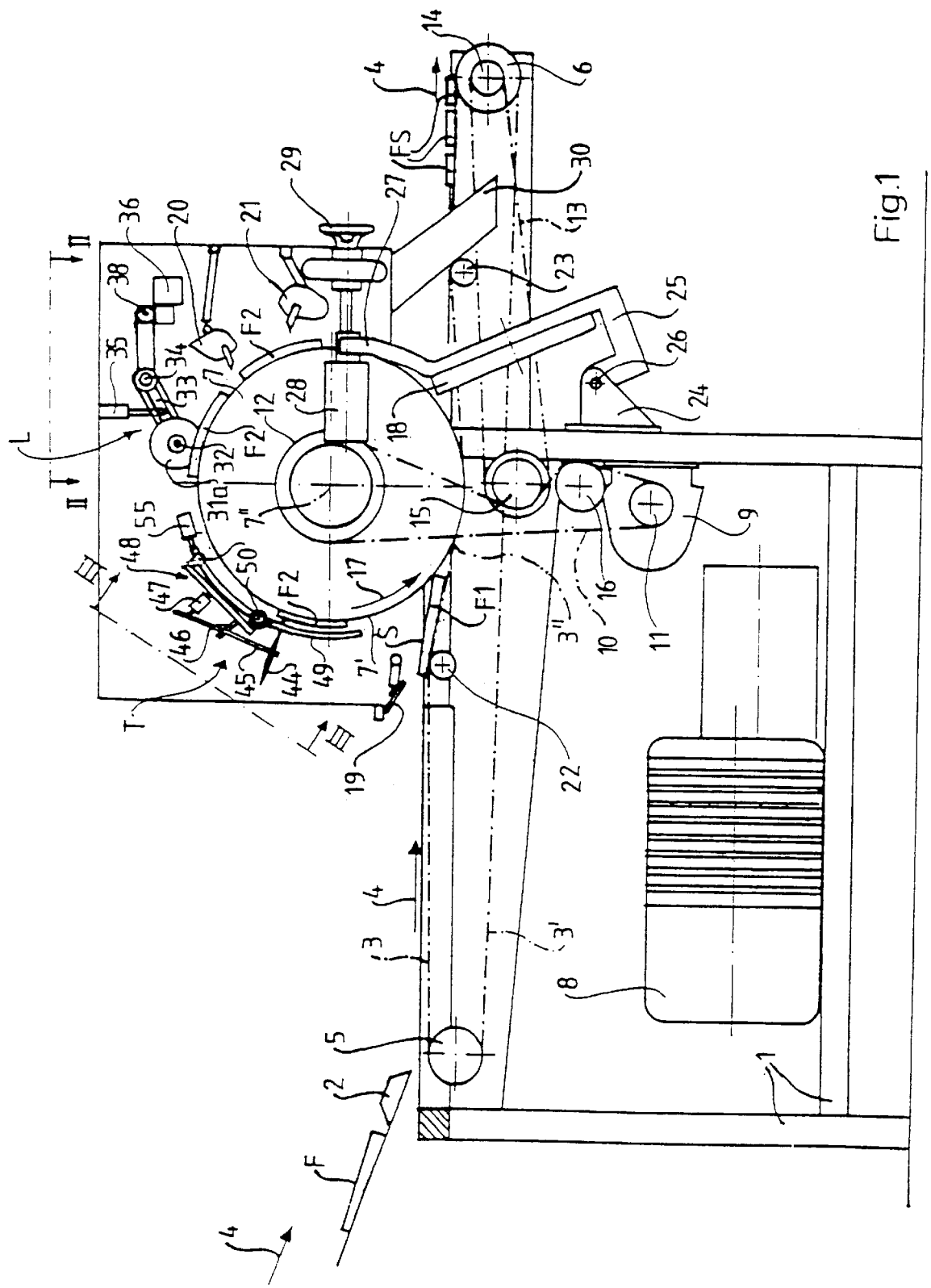
FIG. 1 is a general side elevational view of a machine built in accordance with a preferred embodiment of the invention.

In the drawings, reference numeral 1 denotes the machine frame. At the inlet end for fish fillets F of the frame 1, a supply chute 2 for fillets F has been mounted adjacent an endless belt conveyor 3 extending in the longitudinal direction of the machine (the feeding direction of the fillets) 4, the conveying belt 3 being placed around a turning roller 5 at the upstream end of the machine and a drive roller 6 at the downstream end of the machine. The material of the conveying belt 3 and the suspension thereof are such that the belt 3 has a limited elastic compliance in the lateral direction. The lower part of the belt conveyor 3 is indicated at 3'.

On the frame 1, a cylindrical freezing drum 7, known per se, has been rotatably mounted, the freezing aggregate thereof being indicated by means of the reference numeral 8.

A gear motor 9 mounted to the frame 1 serves to drive both the freezing drum 7 and the belt conveyor 3. A first chain 10 is placed around a chain wheel 11 on the gear motor 9 and a chain wheel 12 on the freezing drum 7, another chain 13 being placed partly around a chain wheel 14 on the drive roller 6 of the belt conveyor 3, partly around a freely turnably mounted chain wheel 15, which is driven by means of first chain 10, reference numeral 16 denoting a stretching chain wheel.

The rotational direction 17 of the freezing drum 7 is anti-clockwise.

The fish fillets F to be worked/treated, i.e. cut into pieces, e.g. according to a stripe-shaped or square cutting pattern effected by means of first and/or second cutting device according to the invention, generally denoted L and T, carry the skin intentionally, and the fillets F are placed in the supply chute 2, skin side S facing upwardly. Thus, one or more fillets F are conveyed forward toward the rotary cylindrical freezing drum 7, resting on the upper part of the belt conveyor 3, skin side S up, so that it is the skin side S of the fillet F which first comes into contact with the jacket face 7' of the freezing drum 7. This is illustrated for a fillet F1 which has just come into contact with the drum jacket face 7'.

In connection with the following description of preferred embodiments of a machine according to the invention, diagrammatically shown in the drawings, one has assumed that elongate fish fillets F, F1 are orientated with their longitudinal direction coinciding with the circumferential and rotational directions of the freezing drum 7 but, in principle, there is nothing to prevent one from orientating the fillets laterally, so that their longitudinal direction will extend substantially parallel to the rotational axis of the freezing drum. When it is stated that first cutting device L according to the invention makes longitudinal cuts in the fillet F, this is based on the assumption that the longitudinal direction of the fillet is parallel to the drum circumference. The same applies when it later is stated that second cutting device T makes lateral cuts. If a fillet is orientated perpendicular to the assumed orientation direction, first cutting device will, thus, carry out lateral cuts and second cutting device T a longitudinal cut.

The rotary cylindrical freezing drum 7 works according to well known principles for fish treatment in general, namely through freezing the wet fillet firmly to the jacket face 7' of the drum 7, at the fillet's skin side S, whereafter the fillet F is kept securely fastened on the drum while it is moved toward and past the cutting tools, namely first and second cutting devices L, T according to the invention and a third cutting device of a design known. Third cutting device may consist of a driven endless band knife 18 of known design. These three cutting devices are further described later on.

At a predetermined distance upstream the freezing drum 7, a movable flap 19 has been disposed; in FIG. 1 the flap 19 has been shown in an open, swung-up position, where it allows fillets F, F1 to pass to the freezing drum 7. The movable flap 19 is controlled electronically and automatically. If one desires to cut a plurality of parallel slices parallel to the drum circumference 7' after said slices have been subjected to cuts longitudinally and/or laterally by means of first and second cutting device, L and T, respectively, such that said slices are divided into e.g. a stripe-shaped or square pattern, resulting in freely lying stripe-shaped or square fish pieces when said slice is cut loose by means of third cutting device 18, the flap 19 is thusly controlled that it only will let past itself a "length" (section) of fish fillet comprising one or more fillets which together are unable to cover the entire drum circumference 7' when it/they are frozen to the jacket face 7' of the drum 7, skin side S innermost, extending with the longitudinal direction thereof in the circumferential and rotational directions 17 of the drum 7.

Reference numerals 20 and 21 denote transferable scraper means, each movable between an active position, not shown, where they scrape along the drum jacket face 7', freeing it from skin frozen thereto and more or less melted and loosened skin, and an inactive position, FIG. 1, wherein the scraper means 20 and 21 are withdrawn, not only out of scraping contact with the drum mantle face, but also so far away from the same that fillets F2 frozen to said face 7', FIG. 1, may pass unimpededly past the scraper means 20, 21 during the rotation of the freezing drum 7.

As previously mentioned, the belt conveyor 3,3' has, partly due to inherent material properties, partly due to suspension, a certain elastic compliance laterally, i.e. vertically. The resilience of the belt conveyor 3,3' downwardly is illustrated in the area of the freezing drum 7, beneath the same, at the front (right) end of the fillet F1, where the upper part of the belt conveyor 3,3' at all times passes through a deflected stretch 3" intermediate an upstream supporting roller 22 and a downstream supporting roller 23, the deflected portion 3" of the belt conveyor, in an area between the supporting rollers 22, 23, following a course substantially corresponding to the radius of the freezing drum 7. Such an arrangement has been found to favour the transfer of fish fillets F1 from belt conveyor 3 to freezing drum 7, so that the freezing of the skin side S of the fillet F1 to the mantle 7' of the drum is ensured in a reliable way as well as effected at a suitable point of time of the fillet transport.

The third cutting device in the form of a known band knife 18, the cutting edge thereof being transferable step by step or infinite variably in relation to the jacket face 7' of the freezing drum 7, is—as previously mentioned—adapted to cut one or more fish meat slices parallel to the drum circumference/the skin side. Likewise, this cutting device must—in order to achieve the present invention's object—be adapted to withdrawal so far spaced from the jacket face 7' of the drum 7 that corresponds to unimpeded passage of the fillets F2 in the direction of the arrow 17. After the fillets F2 have been allowed to pass past third cutting device 18 unimpededly, in order to first being cut in "stripes" by means of first cutting device L and, thereafter, possibly, in "squares" by the completing cutting performed by second cutting device T, third cutting device 18 becomes set in accordance with NO patent application No. 921899.

Third cutting device 18 in the form of a known band knife 18 is transferably mounted on a bracket 24 fixed to the frame 1, and the frame 25 of the band knife 18 is pivotally suspended in the bracket 24 by means of a horizontal pivot 26. An arm 27 of the band knife frame 25 cooperates with a drive means 28 for rotation step by step of the frame 25 and, thus, the cutting edge of the band knife 18 in relation to the freezing drum 7. This drive means 28 may be operated by means of a steering wheel 29 for manual fish slice thickness adjustment, or it may be electronically controlled by means of a programmed control unit. The drive means 28 may be constituted by any suitable mechanism and may e.g. comprise a motion screw adapted to be rotated step by step, and with which the arm 27 of the band knife frame 25 cooperates. If one by means of first cutting device L and/or second cutting device T makes cuts intentionally not penetrating to the inner side of the skin S, in order to obtain fish pieces FS (indicated at the downstream end of the machine) having a thickness which only constitutes a fraction of the original thickness of the fish fillet, the band knife 18 must be set for cutting off the fish portion which is cut partially through, the fish meat slice cut loose—due to the cuts from first and/or second cutting device L and T, respectively—is divided into two or more separate pieces, corresponding to pieces ready to be served (after cooking) or helping/portion pieces, respectively, and having circumferential limiting edges formed partly by the side edges of the fillet, partly through the cuts. Thereafter, the cut fillet may again be conveyed to first and second cutting devices L and T, respectively, in order to be cut through once more substantially perpendicular to the main surfaces of the fillet. Nor the new cuts have to penetrate entirely to the inner side of the skin S, but they may, of course, do so. When the perpendicularly cut through fillet arrives at the band knife 18, the transverse cutting edge of the latter is set closer to the jacket face 7' of the drum 7, adjusted for cutting the cut fillet portion loose, the latter then separating itself into the desired fish pieces FS. Third cutting device's 18 transverse cutting edge will at all times be set for cutting loose the portion of the fillet F2 already cut partially through by first/second cutting device L/T.

Reference numeral 30 denotes a discharge chute for offals, e.g. fish skin scraped loose from the drum mantle 7' by means of the scraper means 20 and 21.

In the following, first and second cutting devices L and T, respectively, are explained more in detail. As previously described, the knife/knives of both these cutting devices shall make cuts extending substantially laterally of the skin side, i.e. more or less perpendicular to the same and to the main surfaces of the fillet F2.

Figure 2:
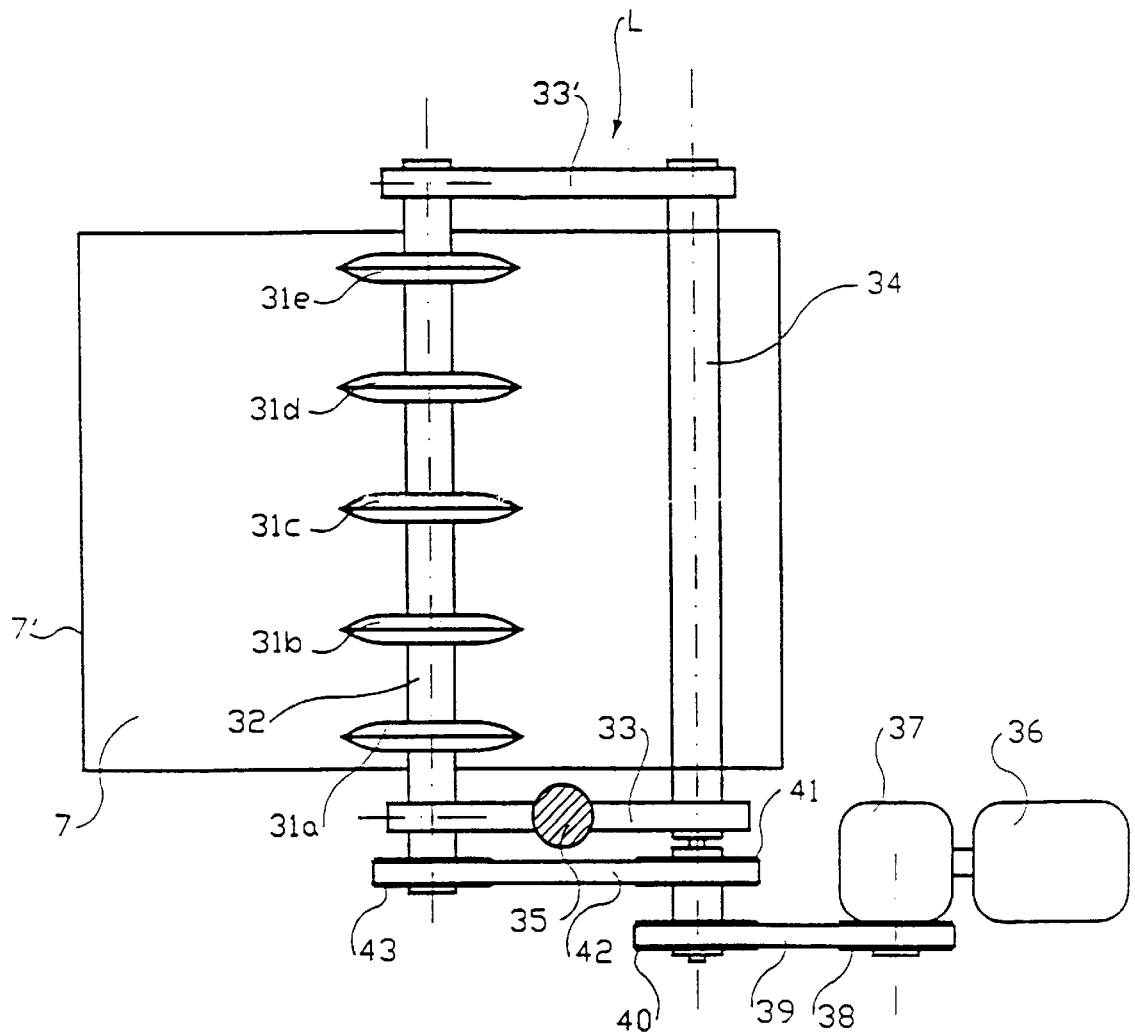
FIG. 2 is a detail view of a first cutting device, shown on a larger scale, and seen in the direction of arrows II—II in FIG. 1.

In the embodiment shown, see FIG. 2 in conjunction with FIG. 1, first cutting device L comprises five circle disc-shaped knives 31a–31e mounted on a common drive shaft 32 extending parallel to the freezing drum axis 7", so that the mid-planes and cutting edges of the knives 31a–31e are substantially perpendicular to the mantle face 7' of the freezing drum 7 and, thus, substantially-perpendicular to the fillet F2. The number of these circle disc-shaped knives 31a–31e is adjusted according to the circumferential shape of the desired fish piece FS. When an elongate fish fillet's longitudinal direction coincides with the circumference of the freezing drum 7, the knives 31a–31e will make cuts in having the same direction is the longitudinal direction of the fillet F2, and these cuts will—when the fish portion cut is being cut loose parallel to the drum jacket surface 7' (by means of third cutting device 18 )—give stripe-shaped fish pieces FS. Preferably, the spacing between the knives 31a–31e of first cutting device are adjustable, in order to be capable of obtaining different fish stripe widths. As previously mentioned, the distance between the knives 31a–31e and the drum mantle face 7' is controlable, and third cutting device 18 is adapted to adjust itself to this controllable property, such as explained previously. Additionally, the rotary circle disc-shaped knives 31a–31e are laterally displaceable, and their respective position on the drive shaft can be changed in motion. The outermost knives 31a and 31e on the shaft 32 may then be brought to follow the contour of the fillet F2.

In the shown embodiment of first cutting device L, see especially FIG. 2, the common drive shaft 32 is connected to a rotary shaft 34 through lateral arms 33, 33', the rotary shaft 34 enabling the drive shaft 32 to pivot in relation to the freezing drum mantle face 7' by means of a servo-cylinder 35.

Reference numeral 36 denotes a motor and 37 a transmission, whilst 38, 39 and 40 denote a belt pulley, a belt and a belt pulley of a first belt drive, and where 41, 42 and 43 denote a belt pulley, a belt and a belt pulley of a second belt drive, for rotating the common shaft 32 of the knives 31a–31e.

The machine and method described hitherto with reference to the drawings satisfy the object of the invention, said object consisting in—based on unskinned fish fillets—the attainment of skinned fish pieces each corresponding to a helping/portion size, a size ready to be served (after cooking, smoking or other preparation) or having other sizes/thicknesses/circumferential shapes.

When elongated fish fillets F, F1, F2 are fed such that their longitudinal direction coincides with the circumferential and rotational directions of the freezing drum 7, the cutting operation made by means of first cutting device's L knives 31a–31e will result in stripe-shaped fish pieces when third cutting device 18 has cut through the cut fish meat portion parallel to the freezing drum circumference 7'. If one desires more square fish pieces, based on cutting of the fillet F2 both longitudinally (by means of first cutting device's L knives 31a–31e) and laterally, one may use second cutting device T, the latter distinguishing itself through features assumed to be advantageous, yet subordinate, for the present invention and which, thus, have been made the subject matter of sub claims.

Figure 3:
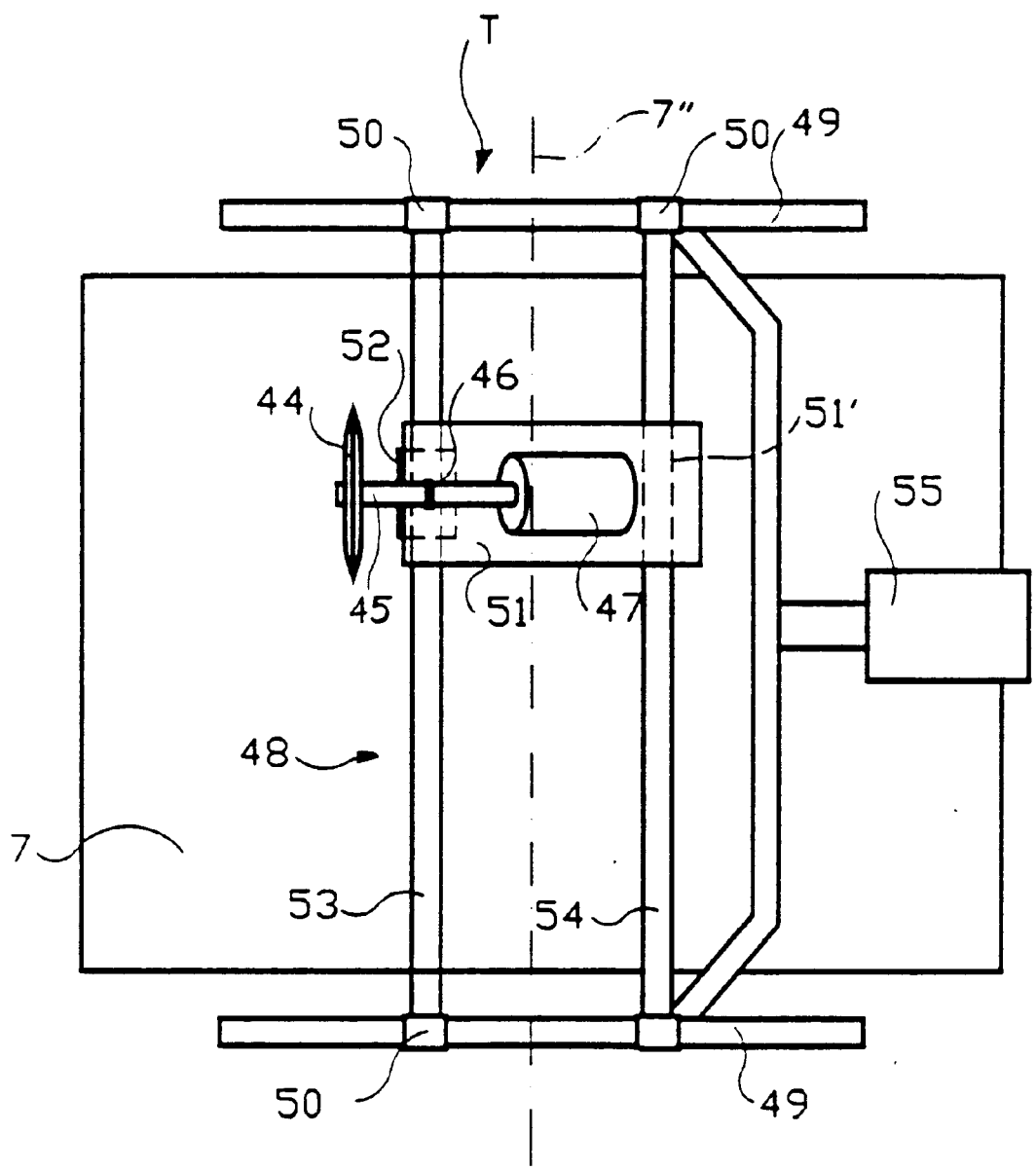
FIG. 3 is a detail view of a second cutting device, shown on a larger scale, seen in the direction of arrows III—III in FIG. 1.

Now, reference is made to FIG. 3 in conjuction with FIG. 1, second cutting device generally being indicated at T. The embodiment shown for second cutting device comprises one rotary circle disc-shaped knife 44, but there is nothing to prevent the use of two or more knives of this kind, adjoining each other and lying in substantially the same inclined plane. The diameter of the knife 44 and the number of knives will be dependent on the width of the fillets F2 to be cut laterally by cuts substantially directed perpendicularly to the mantle face 7' of the drum.

Also here, the depth of cut into the fish meat may be adjustable so that it can be adapted to the slice thickness, which is determined by the band knife 18. To this end, the rotary shaft 45 of the knife 44 is mounted as a two-armed lever, the shaft 45, approximately in the mid-region, passing through a bearing (not shown) on a pillar 46, whilst the free end of the shaft 45 is assigned a servo-cylinder 47.

Cutting laterally of the fillet F2 is, preferably, to be executed without bringing the freezing drum 7 to stop. Therefore, rotary circle disc-shaped lateral knife 44 must be capable of following the drum rotation, synchronous with the same, in order to obtain a straight cut laterally of the fillet F2. Thus, the lateral knife 44 has to be controllable along two paths, namely along an axis parallel to the drum axis 7"

and along a portion of a circle arc-shaped path outside the drum 7 and having its centre positioned at the drum axis 7". To this end, second cutting device T is disposed on a carriage 48 running along circle arc-shaped rails 49, the latter being stationary and extending parallel to the freezing drum's 7 mantle face 7'. The carriage 48 carrying second cutting device's T knife 44 follow the rotary freezing drum 7 until the knife 44 has cut the fillet F2 laterally of the longitudinal direction of the latter. Thereafter, the knife is swung out of contact with the fillet F2 by means of the servo-cylinder 47. The carriage 48 may roll on the guide rails 49 by means of wheels 50 or similar rolling/sliding means.

If one desires to use only one knife 44 in second cutting device T, it is suitable to dispose this displaceably parallel to the freezing drum's 7 rotational axis 7" (i.e. in the lateral direction of the fillet F2). To this end, the knife 44, the shaft 45 and the servo-cylinder 47 can be disposed on a second laterally moving carriage 51, the first or main carriage 48 moving longitudinally. Second carriage 51 carries a step motor 52 meshing with a threaded spindle 53 constituting a part of the carriage's framework, in which, likewise, a smooth rod 54 is incorporated, said rod 54 being parallel to the spindle 53 and cooperating with a sleeve-shaped portion 51' of the laterally moving carriage 51. Reference numeral 55 denotes a drive means, e.g. in the form of a double-acting fluid-driven piston cylinder for the main carriage's movements to and fro parallel to the mantel face 7' of the freezing drum 7.

What is claimed is:

1. A method for mechanical cutting of fish pieces from fish fillets, comprising:

feeding a fillet toward a rotating freezing drum having a jacket face, freezing the fillet to the jacket face of the rotating freezing drum, making at least one cut into the fillet directed substantially in the thickness direction of the fillet while the fillet is being frozen to the jacket face of the rotating freezing drum, resting against the same, and participating in the rotation thereof, and cutting a piece of the fillet loose from a remaining portion of the fillet through a cut formed by a cutting edge extending substantially transversely to the circumferential/rotational direction of the rotating freezing drum.

2. A method as set forth in claim 1, wherein said cut directed substantially in the thickness direction of the fillet is executed by at least one knife which operates substantially perpendicular to the jacket face of the rotating freezing drum.

3. A method as set forth in claim 1, wherein said at least one cut directed substantially in the thickness direction of the fillet does not extend entirely through the thickness of the fillet, in order to obtain a partially cut fillet and wherein the cutting of the piece of the partially cut fillet loose through the cut substantially parallel to the circumferential/rotational direction of the rotating freezing drum defines a boundary layer between the piece and the remaining portion of the fillet.

4. A method as set forth in claim 3, wherein said at least one cut directed substantially in the thickness direction of the fillet comprises two separate cutting operations, in which cuts are executed in the fillet, parallel to the rotational direction of the rotating freezing drum and parallel to the rotational axis of the rotating freezing drum, whereafter the fillet is cut through in the boundary layer between the piece and the remaining portion of the fillet by a cut substantially parallel to the circumferential/rotational direction of the rotating freezing drum.

5. A machine for cutting fish pieces from fillets, comprising:

a rotary freezing drum toward which the fillets are fed and having a jacket face on which the fillets become frozen, cutting means adapted to make cuts substantially parallel to the circumferential/rotational direction of the rotary freezing drum, and a first cutting device, which is adapted to be the first to come into contact with the non-cut fillet, making at least one cut directed in the thickness direction of the fillet, said first cutting device comprising at least one knife.

6. A machine as set forth in claim 5, wherein the first cutting device comprises two or more rotary circle disc-shaped knives mounted on a common drive shaft, which is turnable around an axis parallel to the rotational axis of the rotary freezing drum, in order to be capable of adjusting the spacing between the cutting edge of the knives and the jacket face of the rotary freezing drum, and drive means for effecting the turning movements of the drive shaft in relation to the drum jacket face.

7. A machine as set forth in claim 6, wherein the spacing between the knives is adjustable.

8. A machine as set forth in claim 6, further comprising a second cutting device comprising at least one knife, the cutting edge and plane thereof extending substantially perpendicular to first cutting device's cutting edge(s) and knife plane(s), and which is adapted to make at least one cut into the fillet, extending substantially perpendicular to the cut(s) made by first cutting device, so that the two cut directions form a squared cutting pattern in the fillet.

9. A machine as set forth in claim 8, wherein the second cutting device is disposed on a carriage guided along circle arc-shaped guide rails extending parallel to the rotary freezing drum's jacket face, said carriage being assigned a drive device for the movements of the carriage/second cutting device and fro in the rotational direction of the rotary freezing drum respectively in the opposite direction.

10. A machine as set forth in claim 9, wherein the second cutting device is disposed on a second carriage displaceably disposed parallel to the rotational axis of the rotary freezing drum, so that the knife can be brought to move over at least a substantial distance of the length of the rotary freezing drum, while second cutting device is moving in said path parallel to the jacket face of the rotary freezing drum.

11. A machine as set forth in claim 10, wherein the second cutting device's knife exhibits self-motion and is pivotally disposed around an axis extending parallel to the rotational axis of the rotary freezing drum, in order to enable adjustment of the spacing between said knife's cutting edge and the adjacent portion of the jacket face of the drum, the second cutting device being assigned a drive means for effecting the turning/adjustment dependent on a corresponding adjustment effected in the first device and the cutting means.

* * * * *